Patented Dec. 10, 1935

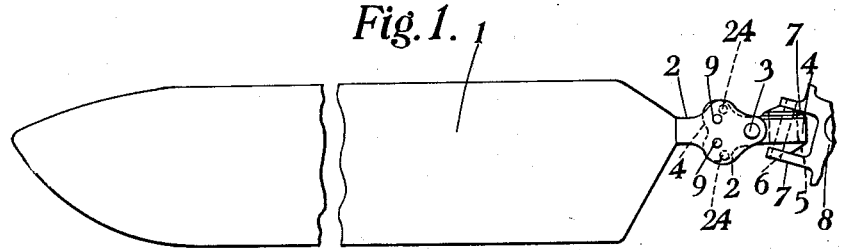

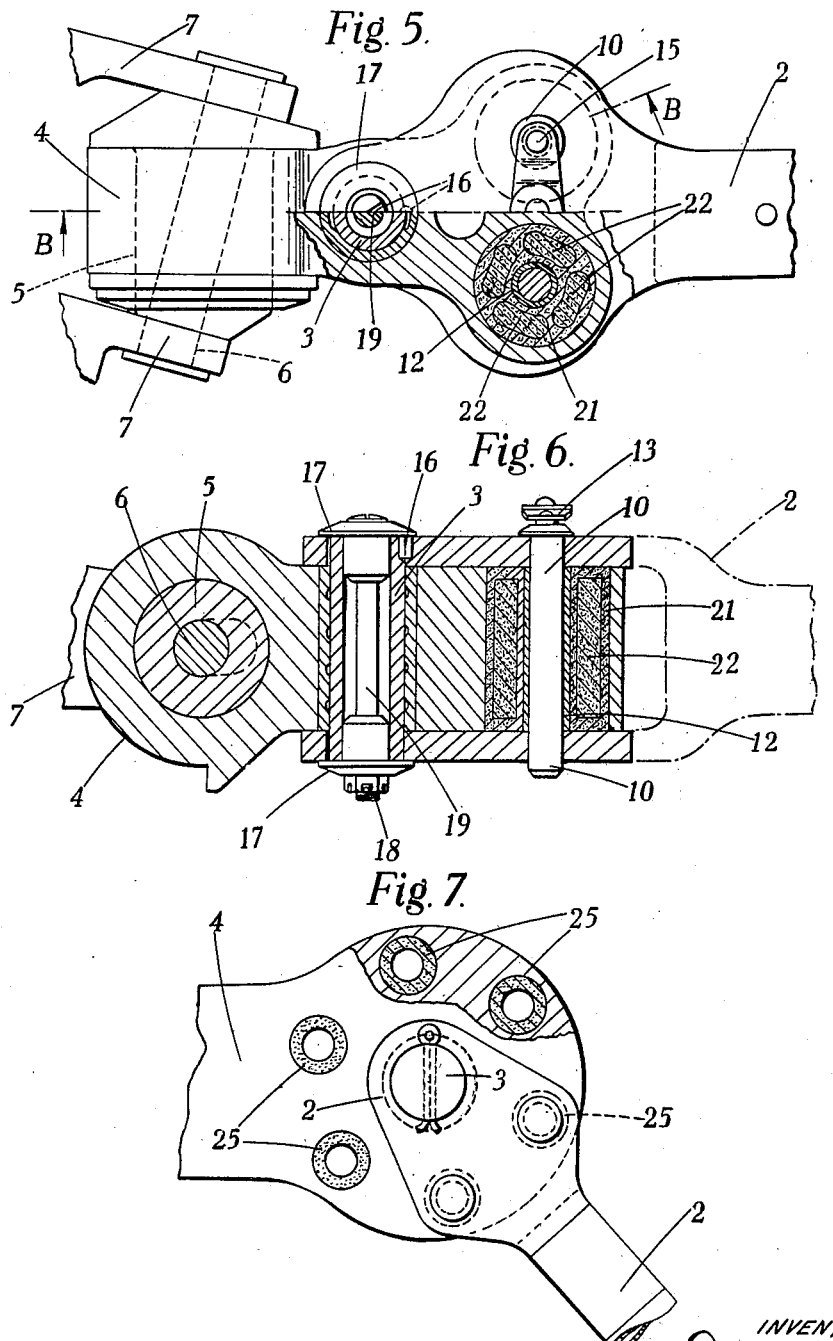

2,023,840

UNITED STATES PATENT OFFICE 2,023,840

REVOLVING WING OR BLADE OF AIRCRAFT

David Kay and John William Dyer, Edinburgh, Scotland, assignors to Kay Gyroplanes Limited, Edinburgh, Scotland Application February 5, 1935, Serial No. 5,080
In Great Britain December 21, 1933

15 Claims. (Cl. 244—19)

The invention relates to that type of revolving sustaining wing or blade system for aircraft in which each wing is operatively connected to a rotor hub or equivalent and is capable of flapping movements in a substantially vertical plane and also of limited lateral movement in the plane of rotation of the system relative to the normal radial position of the wing. The invention is particularly applicable to such systems which are freely rotative under the action of the air pressure when the aircraft is in flight. The invention also relates to such systems which are provided with stop means (e. g. of India rubber) cooperating with abutments for resisting and limiting the said lateral movements of the wings in the plane of rotation.

The object of the present invention is to provide improved means for resisting and limiting the lateral movements of the wings and which may, if desired, also act as means for permitting the folding of the wings towards the fuselage when the aircraft is not in flight.

According to the present invention we provide a revolving wing system of the type referred to, wherein the free movement permitted to each wing in the plane of rotation of the system relative to the normal radial position of the wing is limited by the cooperation of one or more pins interconnecting the wing and the hub or a part associated therewith, with one or more bushes in which the pin or pins engage, said bush or bushes being arranged either in a part of the wing or in the hub or a part associated with the latter.

For example, the said free movement may be limited by the engagement of spaced locking pins carried by a part of the wing in yielding or pliable bushes provided with internal cores or linings and mounted in the rotor hub or in a part associated with the latter, the arrangement also providing means for folding the wing.

In one construction the said bushes are arranged in holes formed in a link connecting the main spar of the wing to the rotor hub, said holes being spaced circumferentially and also arranged at the same radial distance from a main pivot interconnecting the spar to the said link, holes coaxial with the bushes being formed in the main spar to receive the said locking pins and to allow them to pass through the bushes.

The bushes may comprise sealed casings of yielding or pliable material, which are adapted to contain a putty-like or plastic substance and are lined centrally by a metallic sleeve or bush. On the other hand, the sealed casings of yielding or pliable material may comprise a number of independent cavities or a number of spaced and intercommunicating cavities all containing a soft putty-like or plastic substance. As yielding material we may mention rubber, felt, fibre or the like as examples, whilst the said putty-like or plastic substance may consist of an oily and substantially non-volatile liquid (e. g., glycerine) which has no injurious effect on rubber and a soft non-abrasive powder insoluble in the liquid.

The said bushes, may, however, be of metal, in which case the pins will be relatively loosely housed therein.

The advantages of this invention will be obvious. In the first place, the pivotal connection of the root end of the wing obviates danger of the main spar becoming fractured at that end. Secondly, the provision of the arrangement provided by the combination of the locking pins and rigid or non-rigid bushes serves to prevent the dangerous chattering or shocks which occur when revolving wings are being started up or are slowing down or when their rotation is being resisted in flight by air pressure.

In order that the invention may be clearly understood and readily carried into effect, reference will now be made to the accompanying drawings, in which:—

Fig. 1 is a plan view of a wing and part of the rotor hub showing the general arrangement of the wing mounting according to the invention.

Fig. 2 is a part sectional side elevation of a wing mounting showing one form of means for resisting lateral movement of the wing.

Fig. 3 is a section taken on line A—A of Fig. 2 and looking in the direction of the arrows.

Fig. 4 is a plan view of Fig. 2 but shows also a part of the rotor hub.

Fig. 5 is a part sectional plan view corresponding to Fig. 4 but showing a modified form of means for resisting lateral movement of the wing.

Fig. 6 is a section on line B—B of Fig. 5.

Fig. 7 is a plan view of a further modified form of mounting which shows an arrangement for permitting of fore and aft adjustment of the blades.

Referring to the drawings, Fig. 1 shows the present invention as applied to the revolving wings of an aircraft mounted for variation of their angles of incidence in the manner described and claimed in the specification of Patent No. 1,750,778 granted to one of the present applicants.

In this figure 1 is a revolving wing the root end 2 of which is forked and is pivotally mounted at 3 on a connecting link 4, which in turn is pivotally mounted on a sleeve 5 forming the middle or central part of a built-up hinge pin 6 constructed in accordance with the above mentioned patent. The hinge pin 6 is carried in lugs 7 projecting outwards from the central rotating hub 8 of the rotor system which serves to carry all the revolving wings. The arrangement is thus such that each revolving wing 1 is capable of pivotal movements, substantially at right angles to its general plane of rotation and, by virtue of its turnable connection at 3 to the said connecting link 4, is also capable of pivotal movement in its general plane of rotation. In accordance with the present invention, however, means, indicated at 9, 9, are provided for rigidly or non-rigidly resisting the latter movement in both directions. The rigid form of resisting means, which is not specifically illustrated, would be afforded by simple metallic bushes in holes in the link 4; two forms of yielding resisting means are illustrated at Figs. 2–4 and 5–6 respectively.

Referring more particularly to Figs. 2–4, the upper and lower forks of the root end 2 of the wing are formed on opposite sides of the longitudinal axis of the main spar of the wing with co-axial holes to receive headed locking pins 10. Holes, coaxial with those formed in the upper and lower forks, are provided in the connecting link 4 and, in this particular construction, are provided with bushes 11 of pliable material (e. g. of rubber, felt, fibre or the like) which are provided with internal metallic bushes or linings 12 through which the said locking pins 10 pass. The locking pins 10, which are a tight fit in the holes in the jaws of the link 4 and are relatively loosely housed in the bush 12, are retained in position by a resilient bridge member formed by a plate spring 13 supported centrally on a pin 14. Each end of the spring 13 has a downwardly extending projection afforded by the head of a rivet 15, and these heads engage in recesses in the heads of the pins 10 to retain them in position.

The mounting about which limited lateral movement of the wing may take place comprises a sleeve 3 constituting a hinge pin, said sleeve being held against rotation by a key 16 and secured in place by a pair of retaining caps 17 interconnected by a nut and bolt 18, 19.

When the two locking pins 10 are in position, the pivotal movement of the revolving wing 1 in a direction parallel to the plane of rotation is to a certain extent resisted, the reaction of the wing in either direction being taken up gradually and without shock by the pliable bushes. The arrangement, therefore, effectively prevents chattering of the wing when it is commencing to rotate or is slowing down and during the periods in which the rotation is being resisted by air pressure.

Figs. 5 and 6 show a wing mounting corresponding to that just described but varied by the provision of an alternative form of movement-resisting means, which in this case consist of rubber casings 21 of annular form in cross section. Each rubber casing is formed with independent spaced cavities 22 which are filled with a soft putty-like substance and sealed, and is lined by a bush 12 mounted in during manufacture. In the example shown the cavities 22 are independent of each other, but if desired intercommunicating channels could be provided between them.

The substance employed for filling the cavities 22 may of course vary but should always be of a yielding nature and non-resilient. As an example, however, it may consist of an oily and comparatively non-volatile liquid such as glycerine which has no injurious effect on rubber and a soft non-abrasive powder, insoluble in the liquid, such as the whitening which is used as the basis of ordinary putty. The consistency of this "glycerine-putty" can be varied to suit the loading on the shock-absorber and to provide a greater or less damping effect on the resiliency of the rubber in the bush, as found most suitable in practice.

With the constructions shown in Figs. 1–6 all that is necessary to enable the wings to be folded forward or backwards towards the fuselage is to remove the pins 10 and to swing the wing about its pivot 3 until one of the pairs of holes in the blade root 2 registers with a different hole in the link 4, the pins 10 being then replaced and one of them acting to lock the wing in position. If, however, the construction of the mounting is such as not to permit the wing to move through such a wide arc without fouling other parts, additional holes may be formed in the said connecting link 4 on opposite sides of the longitudinal axis of the main spar and at the same radius from the pivotal axis of said main spar as the holes containing the pliable bushes, as indicated at 24 (Fig. 1). When it is desired to fold the wing 1 either forwards or backwards towards the fuselage, both locking pins 10 are removed from their bushes, the main spar is turned about its axis until two of the holes in its end are opposite one of the non-bushed holes 24, whereupon one of the locking pins is inserted through the three coaxial holes.

In the further construction illustrated at Fig. 7 the link 4 connecting the main spar of the revolving wing 1 to the central hub is formed with six holes spaced equidistantly around a circle, the root end 2 of the spar being formed with holes on opposite sides of its longitudinal axis as in the preceding construction. In this construction, however, all the holes in the connecting link are provided with bushes, indicated at 25, for which any of the forms already described may be used and through which the two locking pins 10 are adapted to pass, being relatively loosely housed therein when simple metallic bushes are employed. This arrangement, therefore, differs from the preceding constructions in that the revolving wing can be fixed in more than one folded position on both sides of its central or flying position.

It should be understood that in any of the constructions referred to the locking pins can be housed in bushes of a yielding or non-yielding nature according to requirements.

We claim:—
1. A revolving wing or blade system for aircraft, comprising a hub, wings or blades mounted on the hub for pivotal movement substantially in the plane of rotation of the system, and means yieldable in the direction of movement that yieldably resist said movement and comprising pins and cushion bearings at the sides of the pins, with which the pins have lateral contact.

2. A revolving wing or blade system for aircraft, comprising a hub, wings or blades mounted on the hub for pivotal movement substantially in the plane of rotation of the system, and means yieldable in the direction of movement that yieldably resist said movement, such resisting means comprising pins engaging the root portion of the wing and cushion bearings at the pin sides with which the latter have lateral engagement, and a part associated with the hub in which said bearings are located.

3. A revolving wing or blade system for aircraft, comprising a hub, wings or blades mounted on the hub for pivotal movement substantially in the plane of rotation of the system, and means yieldable in the direction of movement that yieldably resist said movement, such resisting means comprising pins engaging the root portion of the wing and cushion bearings at the pin sides with which the pins have lateral engagement, and a part associated with the hub in which said bearings are located, such root portion and said part having alining holes for the pins.

4. A revolving wing or blade system for aircraft, comprising a hub, wings or blades mounted on the hub for pivotal movement substantially in the plane of rotation of the system, and means yieldable in the direction of movement that yieldably resist said movement, and a member pivotally mounted on the hub for movement substantially normal to the plane of rotation that carries said movement-resisting means, said movement-resisting means comprising pins and cushion bearings at the pin sides, with which the pins have lateral contact.

5. A revolving wing or blade system for aircraft, comprising a hub, wings or blades mounted on the hub for pivotal movement substantially in the plane of rotation of the system, and means yieldable in the direction of movement that yieldably resist said movement, such resisting means comprising pins engaging the root portion of the wing, and tubular bushes through which the pins pass, carried by a part associated with the hub.

6. A revolving wing or blade system for aircraft, comprising a hub, wings or blades mounted on the hub for pivotal movement substantially in the plane of rotation of the system, and means yieldable in the direction of movement that yieldably resist said movement, such resisting means comprising pins engaging the root portion of the wing, and yieldable tubular bushes through which the pins pass, carried by a part associated with the hub.

7. A revolving wing or blade system for aircraft, comprising a hub, wings or blades mounted on the hub for pivotal movement substantially in the plane of rotation of the system, and means yieldable in the direction of movement that yieldably resist said movement, such resisting means comprising pins engaging the root portion of the wing, and yieldable, non-resilient bushes, carried by a part associated with the hub.

8. A revolving wing or blade system for aircraft, comprising a hub, wings or blades mounted on the hub for pivotal movement substantially in the plane of rotation of the system, and means yieldable in the direction of movement that yieldably resist said movement, such resisting means comprising pins engaging the root portion of the wing, and yieldable, non-resilient bushes, carried by a part associated with the hub, said bushes having a metal-lined bore.

9. A revolving wing or blade system for aircraft, comprising a hub, wings or blades mounted on the hub for pivotal movement substantially in the plane of rotation of the system, means yieldable in the direction of movement that yieldably resist said movement, such resisting means comprising pins engaging the root portion of the wing, and bushes, carried by a part associated with the hub, the walls of the bushes being hollow and containing a plastic putty-like substance.

10. A revolving wing or blade system for aircraft, comprising a hub, wings or blades mounted on the hub for pivotal movement substantially in the plane of rotation of the system, means yieldable in the direction of movement that yieldably resist said movement, such resisting means comprising pins engaging the root portion of the wing, and bushes, carried by a part associated with the hub, the walls of the bushes being hollow and containing a plastic putty-like substance, said substance consisting of a non-volatile liquid of oily consistency and a soft, non-abrasive powder insoluble in the liquid.

11. A revolving wing system of the type referred to having wings each free to move substantially in the plane of rotation of the system relative to the normal radial position of the wing and means to limit such free movement of the wings, comprising pins interconnecting the wings and the hub and bushes having yieldable linings in which the pins engage.

12. A revolving wing system, as in claim 11, having a link connection between the wing and the rotor hub, such connection having holes for the bushes, spaced apart in a circumferential arrangement, there being a main pivot interconnecting wing and link, and said holes being the same radial distance from said main pivot, there being holes in a wing member that are co-axial with the bushes to receive the pins and allow them to pass through the bushes.

13. A revolving wing system, of the type referred to having wings each free to move substantially in the plane of rotation of the system relative to the normal position of the wing and means to limit such free movement of the wings, comprising pins interconnecting the wings and the hub and bushes in which the pins engage comprise sealed casings of yieldable material and contain a plastic substance and have a central metallic sleeve lining.

14. A revolving wing system, of the type referred to having wings each free to move substantially in the plane of rotation of the system relative to the normal position of the wing and means to limit such free movement of the wings, comprising pins interconnecting the wings and the hub and bushes in which the pins engage comprise sealed rubber casings, and having within the casings a plastic substance that is an oily and substantially non-volatile liquid not injurious to rubber, and a soft non-abrasive powder, insoluble in the liquid.

15. A revolving wing system, of the type referred to, having a plurality of wings, a support common to all of the wings, a link block between each wing and said support, a pivot between the wing and the link allowing movement of the wing in a direction substantially in the plane of rotation of the wing, between flying and folded positions, and means cooperating with wing and link block, holding the wing in both flying and folded positions.

DAVID KAY.
JOHN WILLIAM DYER.